US009600884B2

(12) United States Patent
Zhu et al.

(10) Patent No.: US 9,600,884 B2
(45) Date of Patent: Mar. 21, 2017

(54) OBJECT SHAPE ALIGNING APPARATUS, OBJECT PROCESSING APPARATUS AND METHODS THEREOF

(71) Applicant: CANON KABUSHIKI KAISHA, Tokyo (JP)

(72) Inventors: Fuguo Zhu, Beijing (CN); Yong Jiang, Beijing (CN); Xian Li, Beijing (CN); Lifeng Xu, Beijing (CN); Dongchao Wen, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 14/857,669

(22) Filed: Sep. 17, 2015

(65) Prior Publication Data

US 2016/0086053 A1 Mar. 24, 2016

(30) Foreign Application Priority Data

Sep. 19, 2014 (CN) .......................... 2014 1 0482349

(51) Int. Cl.
*G06K 9/52* (2006.01)
*G06T 7/00* (2006.01)
(Continued)

(52) U.S. Cl.
CPC ........ *G06T 7/0028* (2013.01); *G06K 9/00281* (2013.01); *G06K 9/4671* (2013.01);
(Continued)

(58) Field of Classification Search
CPC .............. G06T 7/0028; G06K 9/00281; G06K 9/4671; G06K 9/621; G06K 9/6244
See application file for complete search history.

(56) References Cited

U.S. PATENT DOCUMENTS

2010/0124377 A1* 5/2010 Yu ........................ G06K 9/6249
382/224
2016/0070952 A1* 3/2016 Kim .................... G06K 9/00208
382/118
2016/0275339 A1* 9/2016 De la Torre ....... G06K 9/00281

OTHER PUBLICATIONS

Manolova et al, "Facial Expression Classification Using Supervised Descent Method Combined with PCA and SVM", Jun. 23-24, 2014, BIOMET, LNCS 8897, 11 pages.*

(Continued)

*Primary Examiner* — David F Dunphy
(74) *Attorney, Agent, or Firm* — Canon USA, Inc. IP Division

(57) ABSTRACT

An apparatus includes a unit configured to acquire an object shape regression model, which comprises an average object shape, a plurality of regression functions and a plurality of feature selection maps; a unit configured to set an initial object shape for the object image based on the average object shape; a unit configured to calculate at least one feature vector with respect to a plurality of feature points; a unit configured, for each coordinate of the plurality of feature points, to select feature fragments from the calculated feature vector based on a corresponding one of the plurality of feature selection maps and assemble the feature fragments into a sub feature vector; and a unit configured, for at least one coordinate of at least one feature point, to predict a coordinate increment based on the corresponding sub feature vector and a corresponding one of the plurality of regression functions.

25 Claims, 16 Drawing Sheets

(51) Int. Cl.
*G06K 9/00* (2006.01)
*G06T 7/60* (2006.01)
*G06K 9/62* (2006.01)
*G06K 9/46* (2006.01)

(52) U.S. Cl.
CPC .......... *G06K 9/621* (2013.01); *G06K 9/6244* (2013.01); *G06T 2207/30196* (2013.01)

(56) References Cited

OTHER PUBLICATIONS

Sagonas et al, "RAPS: Robust and Efficient Automatic Construction of Person-Specific Deformable Models", Jun. 2014, IEEE Conference on Computer Vision and Pattern Recognition, pp. 1789-1796.*
Xiong et al, "Supervised Descent Method and its Applications to Face Alignment", 2013, Proceedings of the IEEE conference on computer vision and pattern recognition, pp. 532-539.*
Xiong et al, "Supervised Descent Method for Solving Nonlinear Least Squares Problems in Computer Vision", 2007, Journal of Latex Class Files, Vol. 6, No. 1, 15 pages.*

* cited by examiner

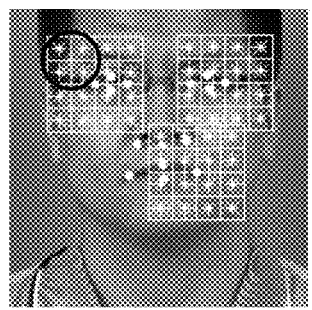
FIG. 11
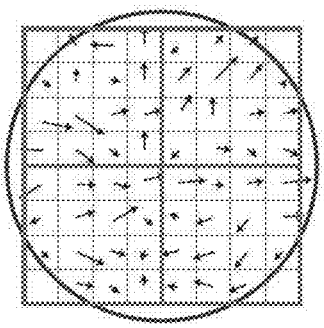
FIG. 12
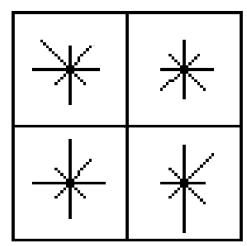
FIG. 13
$$\Delta S = \begin{array}{|c|c|} \hline * & * \\ \hline * & * \\ \hline \end{array} * R'$$
FIG. 14

(a) (b) (c)

(a) (b) (c)

(a) (b) (c)

Feature vector:
$f_1 f_2 \cdots f_{128} \cdots \cdots f_{257} f_{258} \cdots f_{384}$ Feature selection map (a):
$0\ 1\ \cdots\ 1\ 0\ 0\ \cdots\ 1\ 0\ 0\ \cdots\ 1$ Sub feature vector (a):
$f_2 \cdots f_{128} \cdots f_{256} \cdots f_{384}$ Feature selection map (b):
$1\ 0\ \cdots\ 1\ 1\ 0\ \cdots\ 0\ 0\ 0\ \cdots\ 1$ Sub feature vector (b):
$f_1 \cdots f_{128} f_{129} \cdots f_{384}$ Feature selection map (c):
$1\ 0\ \cdots\ 0\ 1\ 0\ \cdots\ 0\ 1\ 1\ \cdots\ 0$ Sub feature vector (c):
$f_1 \cdots f_{128} \cdots f_{257} f_{258} \cdots$

FIG. 21

$$\Delta s_k = \boxed{\begin{array}{c|c} \text{\tiny ↙} & \text{\tiny ⊀} \\ \hline \text{\tiny ⊰} & \text{\tiny Y} \end{array}}_k * r_k^t$$

OBJECT SHAPE ALIGNING APPARATUS, OBJECT PROCESSING APPARATUS AND METHODS THEREOF

This application claims benefit of priority of CN Application No. 201410482349.3 entitled "OBJECT SHAPE ALIGNING APPARATUS, OBJECT PROCESSING APPARATUS AND METHODS THEREOF" filed on Sep. 19, 2014, the content of which is incorporated by reference herein in its entirety.

BACKGROUND OF THE INVENTION

Field of the Invention

The present invention relates in general to the fields of image processing, computer vision and pattern recognition, in particular to an object shape aligning apparatus, an object processing apparatus and methods thereof.

Description of the Related Art

In the fields of image processing, computer vision and pattern recognition, automatically and precisely aligning an object shape described by a set of feature points (or detecting feature points) is a critical task, and this can be widely used, for example, for face recognition, pose recognition, Expression analysis, 3D face modelling, face cartoon animation etc.

Current object shape aligning methods employ either a model-based approach (such as the Active Shape Model (ASM) and the Active Appearance Model (AAM)) or a regression-based approach (such as the Explicit Shape regression (ESR) and the Supervised Descent Method (SDM)).

Since object shape alignment is naturally a regression problem, regression-based approaches have achieved great progress in recent years. Regression-based approaches usually start by initializing an object shape, and then update the initial object shape to approach the ground truth. Differences between various regression-based approaches mainly lie in the feature extraction step and the regression shape increment prediction step.

Taking the SDM as an example. This method estimates the shape increment by minimizing a Non-linear Least Square (NLS) function. During training, the SDM. learns a sequence of descent directions that minimize the mean of NLS functions sampled at different points; and during aligning, the SDM minimizes the NLS objective by using the learned descent directions without computing either the Jacobian or the Hessian.

FIG. 1 schematically shows a flowchart of the SDM. Step 10 belongs to the training procedure, and steps 20 to 40 belong to the aligning procedure.

As shown in FIG. 1, first, at step 10, an object shape regression model, which comprises one regression function (or regressor), is acquired from a plurality of training samples.

Then, at step 20, an initial object shape for an object image is set.

Next, at step 30, one feature vector with respect to a plurality of feature points of the initial object shape is calculated.

More specifically, for example, Scale Invariant Feature Transform (SIFT) features are extracted from local image patches around the plurality of feature points to achieve a robust representation against illumination, and then the extracted SIFT features of the plurality of feature points are assembled into the one feature vector with respect to the plurality of feature points. FIG. 11 schematically shows extracted SIFT feature descriptors (i.e., structural illustration of extracted SIFT features) for three feature points (i.e., the outer eye corners of both eyes and the left mouth corner, which are located at the centers of respective local image patches). In FIG. 11, for example, SIFT features are extracted from an image patch of 4×4 grid around each feature point, and the dimensionality of the extracted SIFT features in each grid is 8. FIG. 12 schematically explains how to get the SIFT feature descriptors with respect to the encircled region of FIG. 11. In FIG. 12, each grid comprises 4×4 pixels for example, and in each pixel, an image gradient can be obtained and is shown as a vector (an arrow with a certain length and pointing to a certain direction). For each grid, a SIFT feature descriptor with a dimensionality of 8 can be obtained from the image gradients therein. FIG. 13 gives an enlarged view of obtained SIFT feature descriptors within the encircled region of FIG. 11, which correspond to the image gradients in FIG. 12. It can be seen from the above that, for each feature point, the dimensionality of the extracted SIFT features can be as high as 4×4×8=128, and thus for the one feature vector with respect to the plurality of feature points, its dimensionality can be as high as 128×(the number of feature points). This means that, in the SDM, the obtained feature vector comprises very rich features, yet has a very high dimensionality.

Finally, at step 40, for a plurality of coordinates of the feature points of the initial object shape, coordinate increments are predicted based on the obtained one feature vector and the one regression function.

For example, the SDM predicts the coordinate increments of the plurality of coordinates by projecting the one feature vector onto the learned one regression function (i.e., the learned descent directions). This may be represented by the following Expression (1):

$$\Delta S = F * R^t \qquad (1)$$

where $\Delta S$ represents the coordinate increments of the plurality of coordinates, F represents the obtained one feature vector with respect to the plurality of feature points, $R^t$ represents the learned one regression function for a certain aligning process (i.e., the t-th aligning process), and the symbol "*" represents the projection or interaction (such as multiplication, dot product, or the like) of both sides. FIG. 14 gives a structural illustration of Expression (1). It is to be noted that, though F represents the assembled one feature vector with respect to the plurality of feature points, in FIG. 14, for simplicity, only the SIFT feature descriptors for 4 grids of 1 feature point is illustrated. It can be seen from the above that, the SDM employs one high dimensional feature vector comprising a plurality of features (i.e., a dense feature set) and one united regression function for the whole object shape to predict the coordinate increments of a plurality of coordinates.

Optionally, the aligning process in FIG. 1 can be repeated for several times (e.g., T times) so as to approach the ground truth of the object shape step by step (this is why the one regression function in Expression (1) has a superscript "t"). In other words, cascaded T regressors can be employed during aligning. FIG. 2 gives a schematic flowchart of a cascaded SDM. Its main steps are essentially the same as those of FIG. 1, and thus description thereof is omitted here.

However, the SDM has many limits.

First, since coordinates of the feature points on an object shape are often highly correlated, extracted features often have two or more highly correlated dimensions (known as multicolinearity). This makes it difficult to create an efficient regressor when the number of feature points increases (e.g., greater than 50), and thus makes the model training procedure unstable.

Second, such a method extracts rich features such as SIFT around each feature point and directly uses the features with thousands of dimensions (containing both useful and useless features) for the sake of getting a better prediction performance. This high dimensional feature vector is highly redundant to the aligning process, and thus makes the model size or dictionary size too big.

Third, due to the high dimensionality of the feature vector, such a method needs vast training samples during training to avoid the over-fitting problem.

Therefore, it is desired that a new object shape aligning apparatus, a new object processing apparatus and methods thereof, which are capable of dealing with at least one of the above problems, can be provided.

SUMMARY OF THE INVENTION

According to a first aspect of the present invention, there is provided an object shape aligning apparatus for an object image, comprising: a unit configured to acquire an object shape regression model, which comprises an average object shape, a plurality of regression functions and a plurality of feature selection maps, from a plurality of training samples; a unit configured to set an initial object shape for the object image based on the average object shape; a unit configured to calculate at least one feature vector with respect to a plurality of feature points of the initial object shape; a unit configured, for each coordinate of the plurality of feature points, to select feature fragments from the calculated feature vector based on a corresponding one of the plurality of feature selection maps and assemble the feature fragments into a sub feature vector; and a unit configured, for at least one coordinate of at least one feature point, to predict a coordinate increment based on the corresponding sub feature vector and a corresponding one of the plurality of regression functions.

According to a second aspect of the present invention, there is provided an object processing apparatus for an object image, comprising: a unit configured to detect an object in the object image; a unit configured to align the detected object by an object shape aligning apparatus; and a unit configured to recognize attributes of the object based on the aligned object.

According to a third aspect of the present invention, there is provided an object shape aligning method for an object image, comprising steps of: acquiring an object shape regression model, which comprises an average object shape, a plurality of regression functions and a plurality of feature selection maps, from a plurality of training samples; setting an initial object shape for the object image based on the average object shape; calculating at least one feature vector with respect to a plurality of feature points of the initial object shape; for each coordinate of the plurality of feature points, selecting feature fragments from the calculated feature vector based on a corresponding one of the plurality of feature selection maps and assembling the feature fragments into a sub feature vector; and for at least one coordinate of at least one feature point, predicting a coordinate increment based on the corresponding sub feature vector and a corresponding one of the plurality of regression functions.

According to a fourth aspect of the present invention, there is provided an object processing method for an object image, comprising steps of: detecting an object in the object image; aligning the detected object by an object shape aligning method; and recognizing attributes of the object based on the aligned object.

Further objects, features and advantages of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate embodiments of the present invention and, together with the description, serve to explain the principles of the present invention.

FIG. 11 schematically shows extracted features from local image patches around three feature points in the SDM;

FIG. 12 schematically shows image gradients within the encircled region of FIG. 11;

FIG. 13 schematically shows an enlarged view of the extracted features within the encircled region of FIG. 11;

FIG. 14 schematically shows the coordinate increment prediction formula of the SDM;

FIG. 21 schematically shows one feature vector, three feature selection maps and three sub feature vectors in the present invention;

DESCRIPTION OF THE EMBODIMENTS

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

As mentioned earlier, the SDM employs one high dimensional feature vector comprising a plurality of features (i.e., a dense feature set) and one united regression function for the whole object shape to predict the coordinate increments of a plurality of coordinates, and thus has many problems such as multicolinearity, feature redundancy, over-fitting and the like. After extensive and in-depth research, the inventors of the present invention have found a new object shape aligning method and a new object processing method which can reduce the dimensionality of the feature vector by performing feature selection. More specifically, in the present invention, as will be seen later, a L1-norm regularized linear regression method, in which a residual sum of square loss function with L1-norm regularization is introduced and Least Angle Regression with Lasso modification is employed to minimize the residual sum of square loss function with L1-norm regularization, is used. Therefore, the present invention can, for each coordinate of the feature points of the object shape, employ a specific sub feature vector with much lower dimensionality (i.e., feature fragments that are most correlated or valuable with the coordinate) and a specific regression function to predict its coordinate increment. In such a manner, the object shape aligning method and the object processing method of the present invention are capable of reducing the model size compared to the prior art method. Furthermore, in such a manner, the object shape aligning method and the object processing method of the present invention are also capable of achieving higher accuracy and/or higher speed and/or higher robustness compared to the prior art method.

Below, first, a schematic hardware configuration of a computing device 9000 which can implement the object shape aligning method and/or the object processing method according to the present invention will be described with reference to FIG. 3. For the sake of simplicity, only one computing device is shown. However, a plurality of computing devices can also be used as needed.

Figure 1:
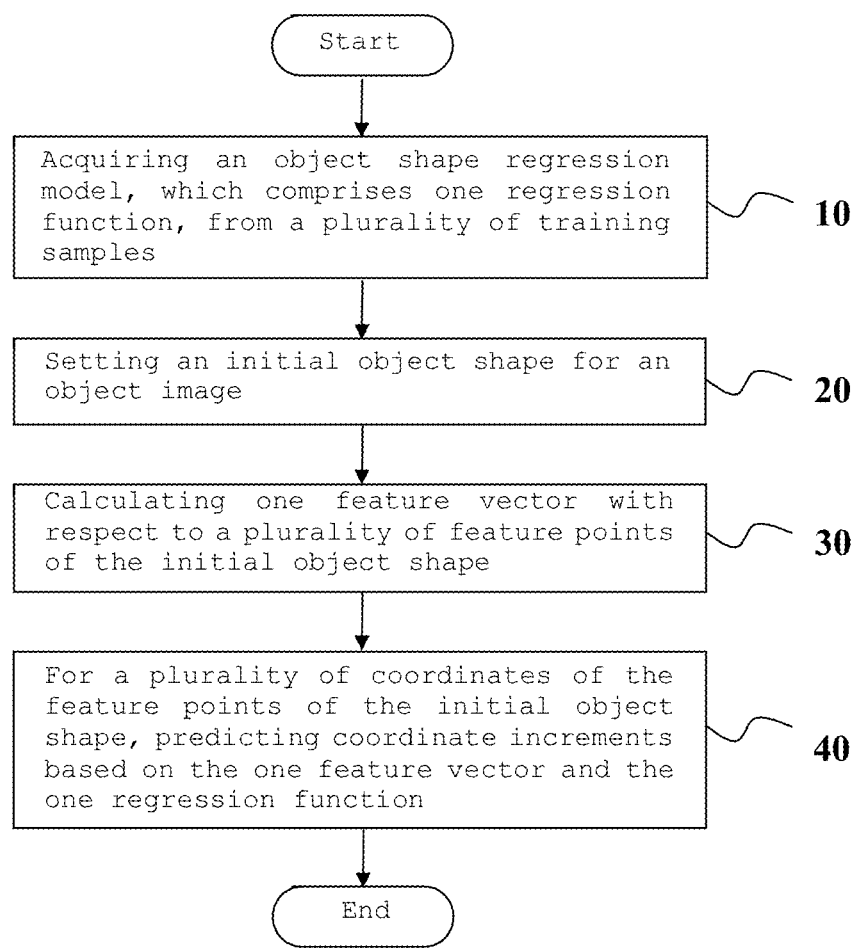
FIG. 1 schematically shows a flowchart of the SDM.
Figure 2:
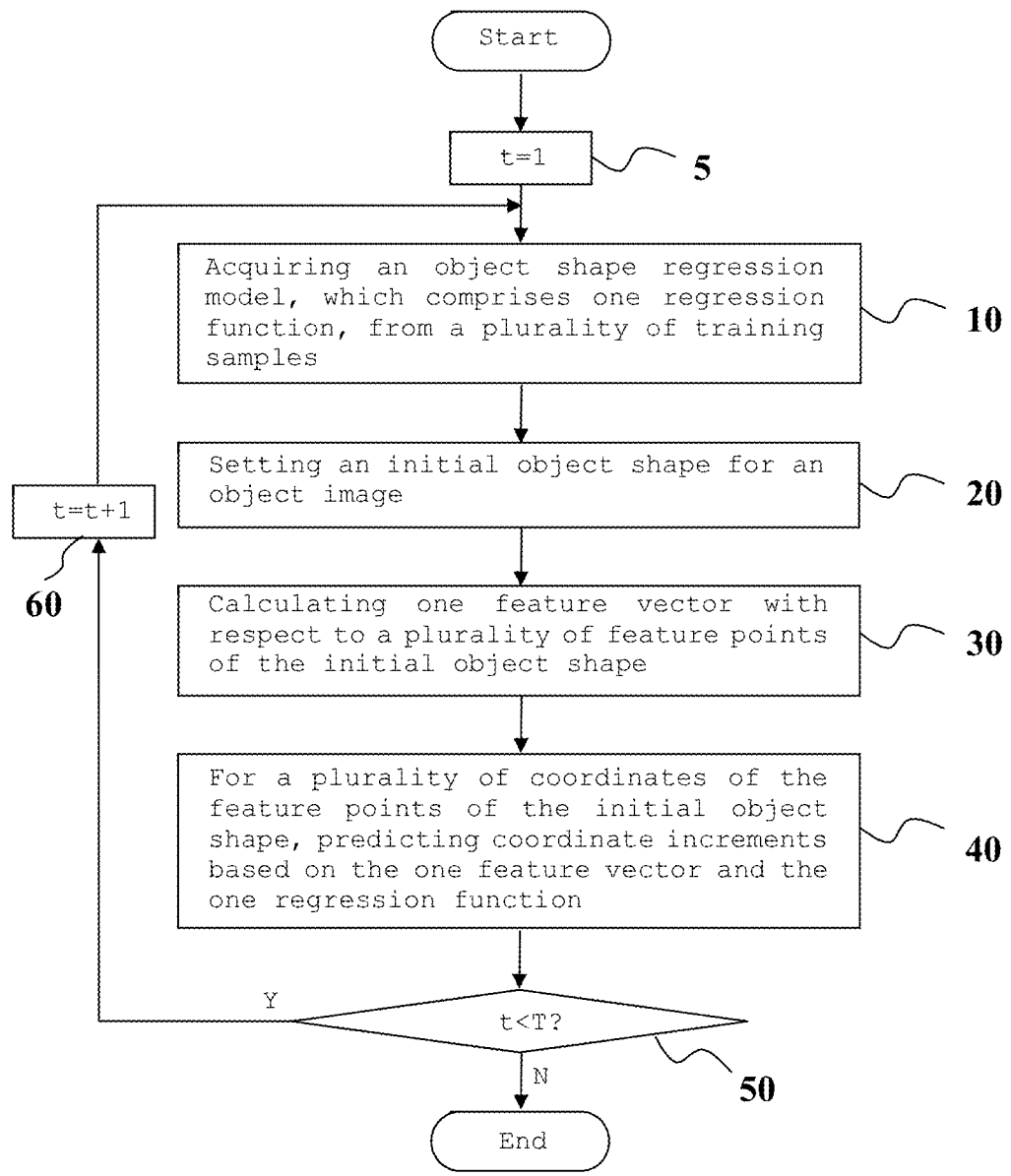
FIG. 2 schematically shows a flowchart of a cascaded SDM.
Figure 3:
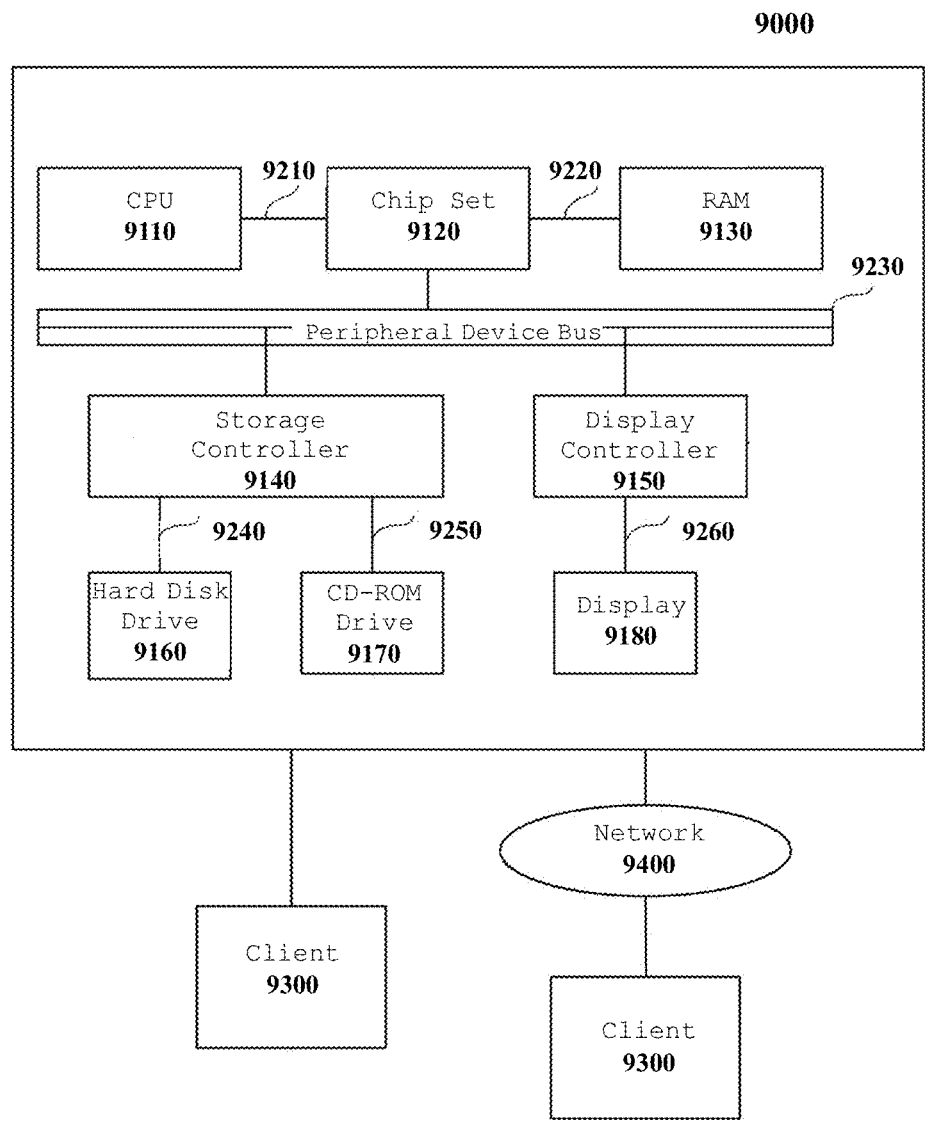
FIG. 3 is a schematic block diagram of a hardware configuration of a computing device which can implement an object shape aligning method and an object processing method according to the present invention.

As shown in FIG. 3, the computing device 9000 can comprise a CPU 9110, a chip set 9120, a RAM 9130, a storage controller 9140, a display controller 9150, a hard disk drive 9160, a CD-ROM. drive 9170, and a display 9180. The computing device 9000 can also comprise a signal line 9210 that is connected between the CPU 9110 and the chip set 9120, a signal line 9220 that is connected between the chip set 9120 and the RAM 9130, a peripheral device bus 9230 that is connected between the chip set 9120 and various peripheral devices, a signal line 9240 that is connected between the storage controller 9140 and the hard disk drive 9160, a signal line 9250 that is connected between the storage controller 9140 and the CD-ROM drive 9170, and a signal line 9260 that is connected between the display controller 9150 and the display 9180.

A client 9300 can be connected to the computing device 9000 directly or via a network 9400. The client 9300 can send an object shape aligning task and/or an object processing task to the computing device 9000, and the computing device 9000 can return object shape aligning results and/or object processing results to the client 9300.

Next, an object shape aligning method according to the present invention will be described in detail. Here, as an example, assuming the object shape to be aligned is a face shape. However, it is readily apparent that it is not necessarily limited thereto. For example, the object shape aligning method according to the present invention can also be applied to various other object shapes, such as a body shape or the like.

Figure 4:
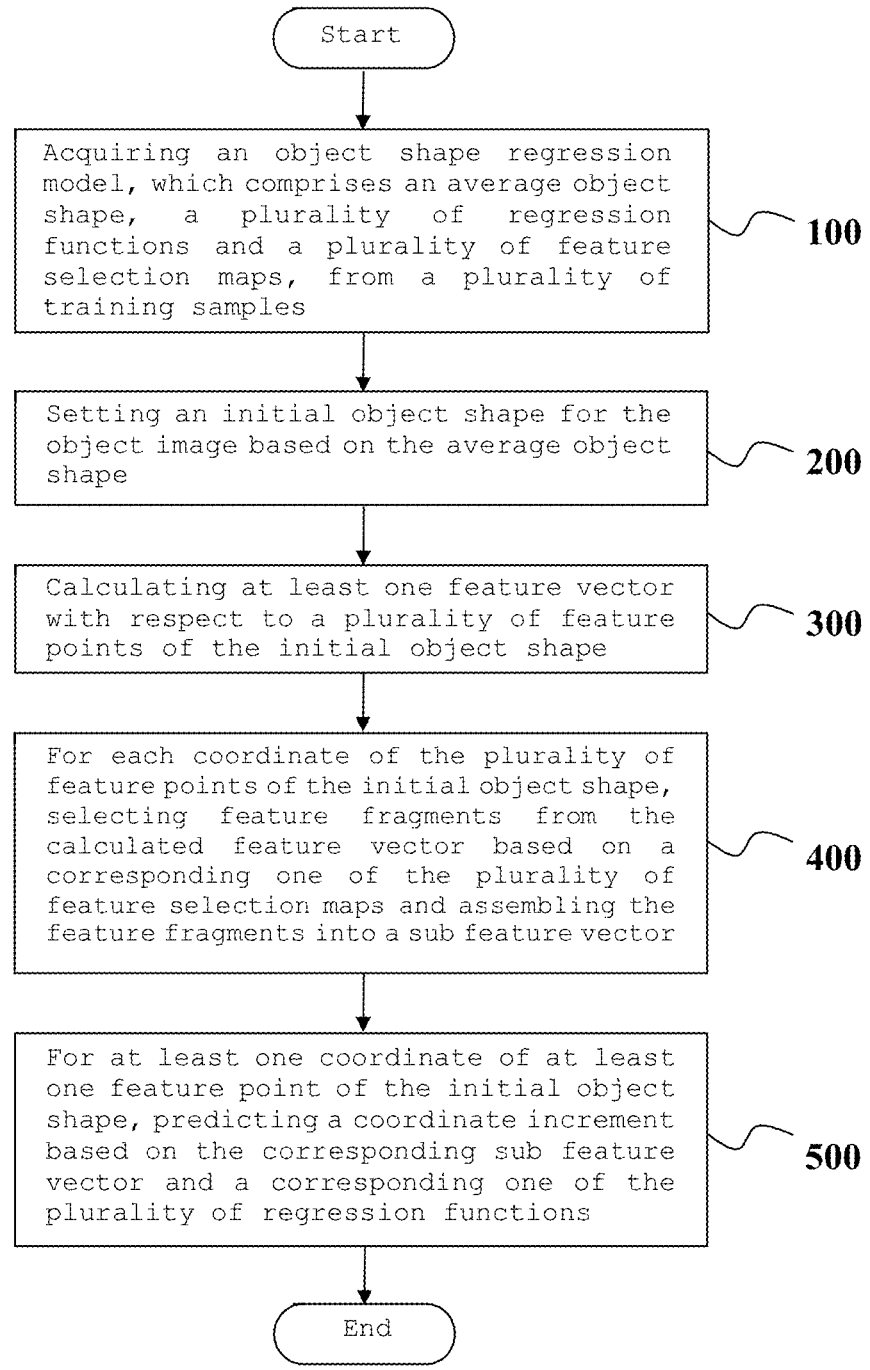
FIG. 4 schematically shows a general flowchart of the object shape aligning method according to the present invention.

FIG. 4 schematically shows a general flowchart of the object shape aligning method according to the present invention.

As shown in FIG. 4, first, at step 100, an object shape regression model, which comprises an average object shape, a plurality of regression functions and a plurality of feature selection maps, are acquired from a plurality of training samples.

Figure 5:
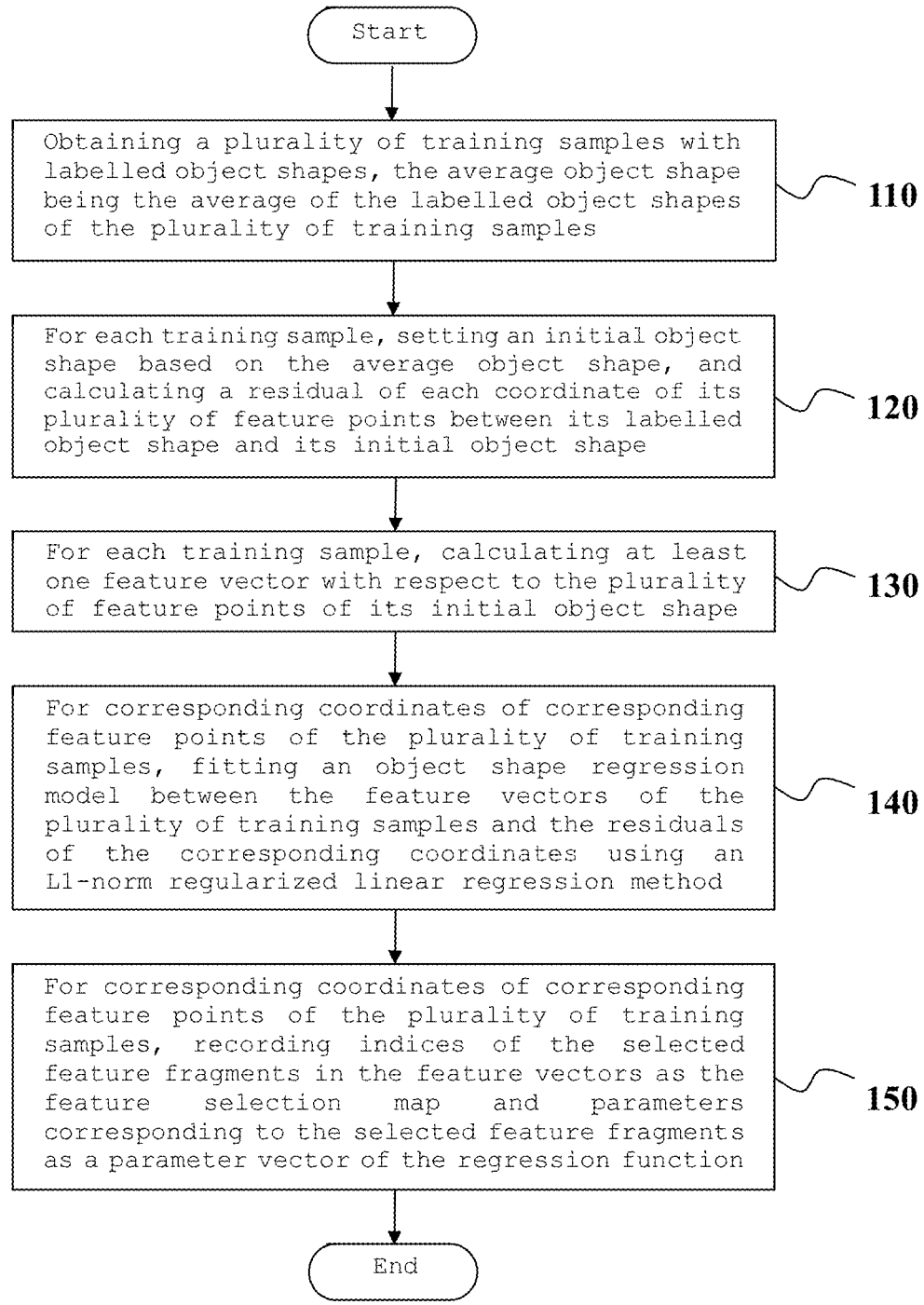
FIG. 5 schematically shows a flowchart of a step for acquiring an object shape regression model according to the present invention.

Generally, the object shape regression model is pre-learned off-line by using a plurality of training samples with manually labelled object shapes. FIG. 5 gives an exemplary flowchart of the object shape regression model acquiring step 100.

In FIG. 5, first, at step 110, a plurality of training samples with labelled object shapes are obtained.

Figure 15:
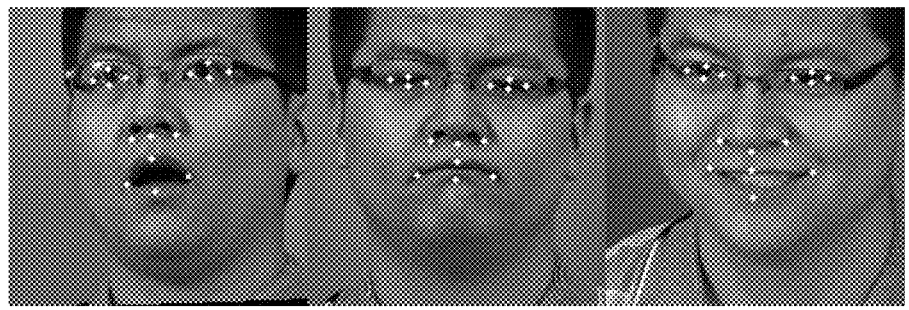
FIG. 15 includes (a), (b) and (c), which schematically show labelled object shapes for three training samples in the step for acquiring an object shape regression model according to the present invention.

As an example, a plurality of face images may be first collected and then labelled manually with predefined facial feature points, i.e., the ground truth of the face shapes (see FIG. 15). In FIG. 15, there are shown three facial images as training samples (a)-(c); and for each facial image, there are shown, for example, 15 labelled feature points (i.e., 4 feature points for each eye, 3 feature points for the nose, and 4 feature points for the mouth). However, the number of training samples and the number of feature points are not particularly limited, and they can be selected as appropriate. In addition, the average object shape can be obtained as the average of the labelled object shapes of the plurality of training samples.

Figure 16:
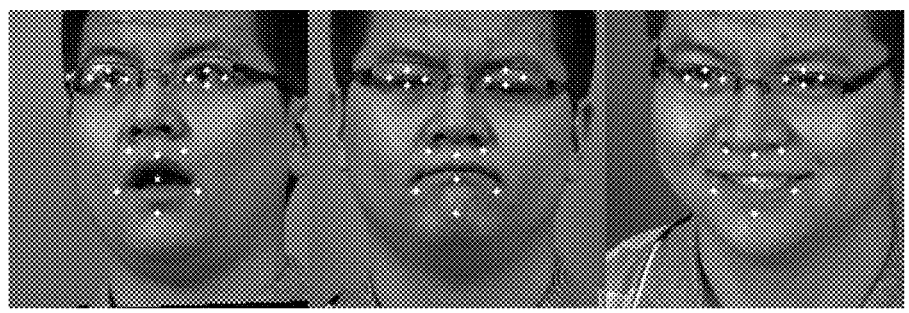
FIG. 16 includes (a), (b) and (c), which schematically show initial object shapes for the three training samples in the step for acquiring an object shape regression model according to the present invention.

Next, at step 120, for each training sample, an initial object shape is set based on the average object shape (see FIG. 16(*a*)~(*c*)), and a residual of each coordinate of its plurality of feature points between its labelled object shape and its initial object shape is calculated.

Here, the initial object shape can be set as the average object shape itself. Alternatively, the initial object shape can be set by randomly perturbing the average object shape. As can be seen from the comparison between FIG. 15 and FIG. 16, for each training sample, differences usually exist between the labelled object shape and the initial object shape, and the differences can be obtained as the residuals of feature point coordinates.

Then, at step 130, for each training sample, at least one feature vector with respect to the plurality of feature points of its initial object shape is calculated.

Figure 17:
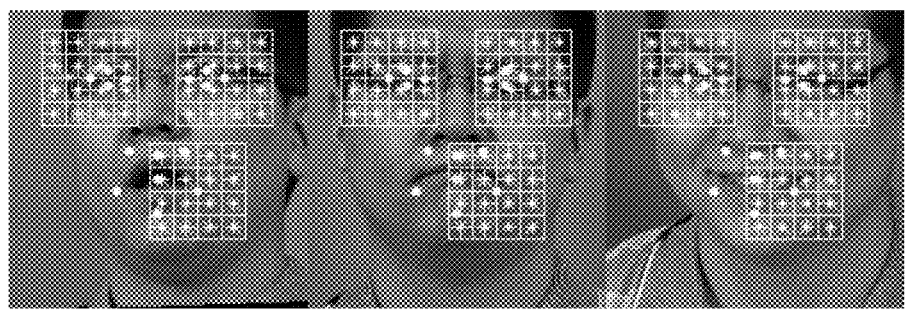
FIG. 17 includes (a), (b) and (c), which schematically show extracted features for the three training samples in the step for acquiring an object shape regression model according to the present invention.

As an example, for each training sample, SIFT features can be extracted from local image patches around the plurality of feature points, and then the extracted SIFT features of the plurality of feature points can be assembled into one feature vector with respect to the plurality of feature points. Extracted SIFT features are schematically shown in FIG. 17(a)-(c). In FIG. 17(a)~(c), for simplicity, as in FIG. 11, the SIFT feature descriptors for only three feature points are shown for each training sample; SIFT features are extracted from a local image patch of 4×4 grid around each feature point (which is located at the center of its corresponding local image patch); the dimensionality of the extracted SIFT features in each grid is 8; and the dimensionality of the extracted SIFT features for each feature point is as high as 4×4×8=128. Obviously, the obtained feature vector for each training sample is a dense feature set, which comprises very rich features, yet has a very high dimensionality.

Incidentally, it is to be noted that, the size of the local image patch is not particularly limited, and thus the dimensionality of the feature vector is not necessarily limited to the above.

In addition, incidentally, in the examples of FIG. 17(a)-(c), SIFT features are extracted. However, the type of the extracted features is not particularly limited. Instead, various other features, such as Speeded Up Robust Features (SURF), Histogram of Oriented Gradients (HOG) or the like, can also be employed.

Subsequently, at step 140, for corresponding coordinates of corresponding feature points of the plurality of training samples, an object shape regression model is fitted between the feature vectors of the plurality of training samples and the residuals of the corresponding coordinates using an L1-norm regularized linear regression method.

The purpose of step 140 is to learn the relationship between the feature vectors and the coordinate residuals so as to obtain feature selection maps and regression functions to be used during aligning. To this end, in the present invention, an L1-norm regularized linear regression method, in which a residual sum of square loss function with L1-norm regularization is introduced and Least Angle Regression with Lasso modification is employed to minimize the residual sum of square loss function with L1-norm regularization, is used.

This can, for example, be represented by the following Expression (2):

$$r(\beta) = \arg\min_{\beta} \left[ \frac{1}{2} \sum_{i=1}^{N} \left\| \Delta s_i - \beta_0 - \sum_{j=1}^{P} f_{ij} \cdot \beta_j \right\|_2^2 + \lambda \cdot \sum_{j=1}^{P} |\beta_j|_1 \right] \quad (2)$$

where $f_{ij}$ represents the j-th dimension of the feature vector extracted from the i-th training sample; $\Delta s_i$ represents the residual of a certain coordinate of the feature points of the i-th training sample; $\lambda$ represents a coefficient which controls the degree of sparseness for feature selection; N represents the total number of training samples; P represents the total number of dimensionality of a feature vector; $\beta$ (such as $\beta_0$ and $\beta_j$) represents a series of regressor parameters; and r represents the regression function for the certain coordinate. The meaning of Expression (2) is to seek suitable $\beta$ such that the value of the expression in the brackets is minimized. It is readily apparent that the regression function r is obtained as long as the parameter $\beta$ is obtained.

In the present invention, L1-norm regularization is introduced (see the last term in Expression (2)). Due to the sparse property of L1-norm regularization, the learned parameter matrix will be a sparse matrix populated primarily with zeros. Only elements corresponding to features that are most correlated or useful with the aligning process are non zero. That is to say, it enables to make feature selection from a dense feature set, thereby reducing the dimensionality of the feature vector. Since only parameters corresponding to the most useful features are needed to be stored, the model size is expected to be reduced greatly.

Expression (2) may also be represented in a vector form by the following Expression (3):

$$r(\beta) = \frac{1}{2} \|\Delta s - f \cdot \beta\|_2^2 + \lambda \cdot |\beta|_1 \quad (3)$$

Expression (2) or (3) is a typical lasso problem and can be solved by using various solvers. In the present invention, Least Angle Regression with Lasso modification is adopted for example, which is an extremely efficient algorithm for computing the entire lasso path.

Incidentally, as can be readily seen from Expressions (2) and (3), they are directed to corresponding coordinates of corresponding feature points of the plurality of training samples. More specifically, assuming an object shape S includes M feature points, it can be represented by the following Expression (4):

$$S = [x_1, x_2, \ldots, x_M, y_1, y_2, \ldots, y_M] \quad (4)$$

where x and y represent coordinates of feature points. Then, the shape residual (or the shape increment) $\Delta S$ may be represented by the coordinate increment of each coordinate as follows:

$$\Delta S = [\Delta x_1, \Delta x_2, \ldots, \Delta x_M, \Delta y_0, \Delta y_2, \ldots, \Delta y_m] \quad (5)$$

Here, in Expressions (2) and (3), As is employed to represent a certain coordinate from M feature points, which can indicate any one of $\Delta x_1$ to $\Delta x_m$ and $\Delta y_1$ to $\Delta y_M$. Therefore, the above-mentioned "corresponding coordinates of corresponding feature points of the plurality of training samples" refers to, for example, all $\Delta x_e$ of the plurality of training samples, all $\Delta y_M$ of the plurality of training samples, or the like.

After the fitting step 140, finally, at step 150, for corresponding coordinates of corresponding feature points of the plurality of training samples, indices of the selected feature fragments in the feature vectors are recorded as the feature selection map and parameters corresponding to the selected feature fragments are recorded as a parameter vector of the regression function.

As mentioned earlier, since L1-norm regularization is introduced, the learned parameter matrix for $\beta$ will be a sparse matrix populated primarily with zeros. That is to say, it is enabled that only some features (the number of which can, for example, be controlled by $\lambda$), which are the most correlated or most valuable feature fragments, are selected from the calculated feature vector comprising a plurality of extracted features. Then, indices (corresponding to the dimensionality variable j in Expression (2)) of the selected feature fragments in the feature vector can be recorded as the feature selection map to be used during aligning. In addition, parameters $\beta_j$ corresponding to the selected feature fragments can be recorded as a parameter vector of the regression function to be used during aligning.

Incidentally, as can be readily seen from Expressions (2) and (3), both the feature selection map (i.e., the selected indices) and the regression function (i.e., its parameter vector) are directed to corresponding coordinates of corresponding feature points of the plurality of training samples. In other words, for each coordinate in the object shape, one corresponding feature selection map and one corresponding regression function are obtained. Therefore, for a plurality of coordinates in the object shape, a plurality of feature selection maps and a plurality of regression functions are obtained in this step.

Up to now, the training procedure has been completed. Next, going back to FIG. 4, the aligning procedure can be performed as in steps 200~500.

Figure 18:
FIG. 18 schematically shows an initial object shape in the step for setting an initial object shape according to the present invention.

First, at step 200, an initial object shape for the object image is set based on the average object shape (see FIG. 18).

As mentioned earlier, the initial object shape can be set as the average object shape itself. Alternatively, the initial object shape can be set by randomly perturbing the average object shape. In FIG. 18, likewise, there are shown 15 feature points (i.e., 4 feature points for each eye, 3 feature points for the nose, and 4 feature points for the mouth). However, the number of feature points is not particularly limited as long as it is the same as that in the training procedure.

Next, at step 300, at least one feature vector with respect to a plurality of feature points of the initial object shape is calculated.

Figure 19:
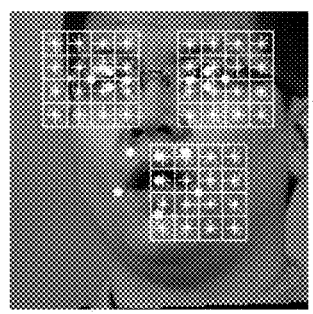
FIG. 19 schematically shows extracted features in the step for calculating at least one feature vector according to the present invention.

As mentioned earlier, SIFT features can be extracted from a local image patch around each of a plurality of feature points of the initial object shape, and then the extracted SIFT features of the plurality of feature points can be assembled into one feature vector with respect to the plurality of feature points. Extracted SIFT feature descriptors are schematically shown in FIG. 19. In FIG. 19, for simplicity, as in FIG. 17 (a)~(c), the SIFT feature descriptors for only three feature points are shown; SIFT features are extracted from a local image patch of 4×4 grid around each feature point (which is located at the center of its corresponding local image patch); the dimensionality of the extracted SIFT features in each grid is 8; and the dimensionality of the extracted SIFT features for each feature point is as high as 4×4×8=128. It is to be noted, however, that the size of the image patch (and thus the dimensionality of the feature vector) and the type of the extracted features are not particularly limited as long as they are the same as those in the training procedure. That it to say, this step for obtaining the feature vector is the same as that in the training procedure.

Then, at step 400, for each coordinate of the plurality of feature points of the initial object shape, feature fragments are selected from the calculated feature vector based on a corresponding one of the plurality of feature selection maps and the selected feature fragments are assembled into a sub feature vector.

More specifically, step 400 can, for example, be carried out as follows: in the case of selecting the feature fragments, the feature fragments are selected from the calculated feature vector based on feature indices in the corresponding one of the plurality of feature selection maps; and in the case of assembling the feature fragments, the feature fragments are assembled into the sub feature vector based on the feature order in the corresponding one of the plurality of feature selection maps. FIG. 21 schematically shows the relationship among the feature vector, the feature selection map and the sub feature vector.

Though the feature vector in fact comprises features for a plurality of feature points, for simplicity, the feature vector in FIG. 21 only shows features for three feature points, wherein features $f_1$ to $f_{128}$, features $f_{129}$ to $f_{256}$, and features $f_{257}$ to $f_{384}$ correspond to different feature points respectively, and thus are shown in different shades. Obviously, the feature vector is a dense feature set, which comprises very rich features, yet has a very high dimensionality.

In the present invention, instead of using this high dimensional feature vector directly, the most correlated or the most valuable feature fragments are selected therefrom based on the feature selection map to be assembled into a sub feature vector with much lower dimensionality for each coordinate in the initial object shape. FIG. 21 schematically shows the feature selection maps (a) to (c) and the corresponding sub feature vectors (a) to (c) for three exemplary coordinates. As mentioned earlier, the feature selection map comprises indices of the selected feature fragments in the feature vector. The form of the feature selection map is not particularly limited, as long as it is capable of indicating the selected feature fragments. FIG. 21 gives an exemplary form of the feature selection map. More specifically, the feature selection map can be a vector with the same dimensionality as that of the feature vector. Its elements are either 0 or 1. For example, "0" represents the corresponding feature with the same dimensionality index is not selected, whereas "1" represents the corresponding feature with the same dimensionality index is selected. Then, the selected feature fragments for each coordinate can be assembled into a sub feature vector based on the feature order in the feature selection map. As can be seen from FIG. 21, the sub feature vectors for different coordinates can be different. In other words, the sub feature vector is specific to each coordinate. Moreover, the dimensionality of the sub feature vector is greatly reduced compared to that of the feature vector.

Figures 22, 23:
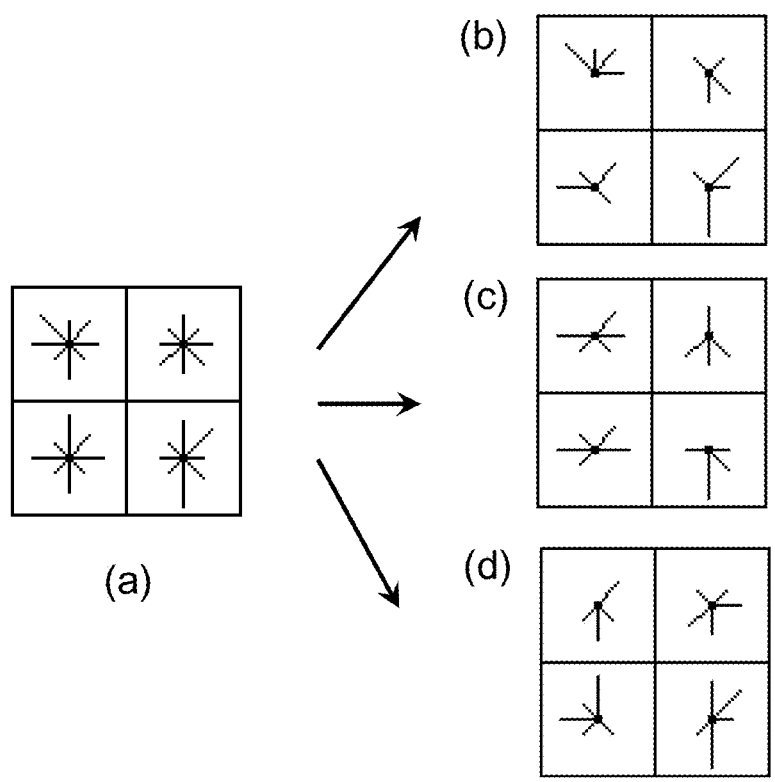
FIG. 22 comparatively shows extracted features and corresponding selected features in the present invention, wherein (a) schematically shows extracted features, and (b)-(d) schematically show three examples of corresponding selected features.
FIG. 23 schematically shows the coordinate increment prediction formula in the present invention.

In order to better illustrate the feature selection result of the present invention, FIG. 22 comparatively shows SIFT features before selection (see (a)) and three examples of SIFT features after selection (see (b)~(d)). For simplicity, FIG. 22 only shows SIFT feature descriptors for 4 grids around a feature point. Before feature selection, the feature dimensionality in each grid is 8 (see (a)). After feature selection, the feature dimensionality in a grid can be lower than 8, and the specific situation depends on the coordinate in the object shape.

Now going back to FIG. 4. After the sub feature vectors are obtained, finally, at step 500, for at least one coordinate of at least one feature point of the initial object shape, a coordinate increment is predicted based on the corresponding sub feature vector and a corresponding one of the plurality of regression functions.

Figure 6:
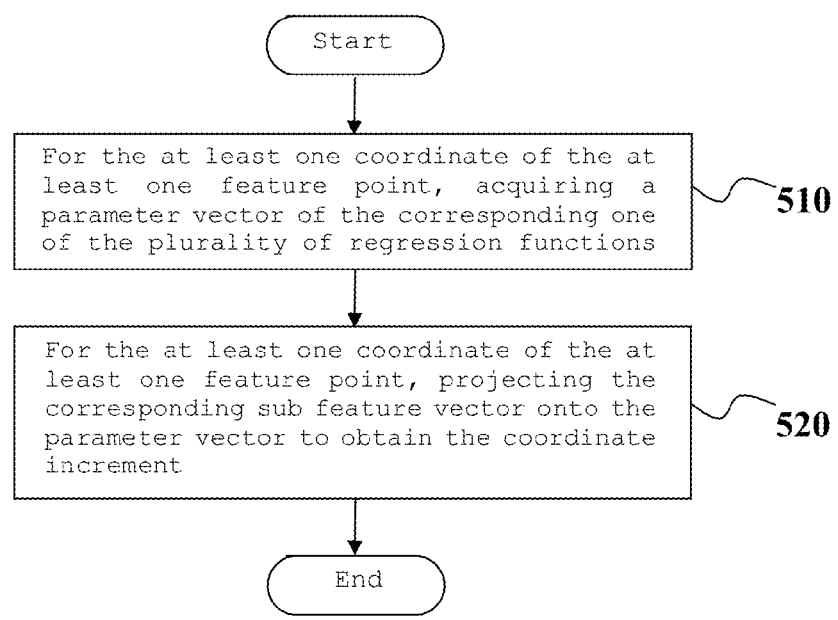
FIG. 6 schematically shows a flowchart of a step for predicting coordinate increments according to the present invention.

The coordinate increment prediction step 500 can, for example, be carried out as shown in FIG. 6.

As shown in FIG. 6, at step 510, for the at least one coordinate of the at least one feature point, a parameter vector of the corresponding one of the plurality of regression functions is first acquired.

Then, at step 520, for the at least one coordinate of the at least one feature point, the corresponding sub feature vector is projected onto the parameter vector to obtain the coordinate increment.

This may be represented by the following Expression (6):

$$\Delta s_k = f_k * r_k^t \tag{6}$$

where $\Delta s_k$ represents the coordinate increment of the k-th coordinate in the object shape (assuming there are M feature points in total as in Expression (5), variable k can range from 1 to 2M, and $\Delta s_k$ can indicate any one from $\Delta x_1$ to $\Delta x_m$ and $\Delta y'$ to $\Delta y_m$), $f_k$ represents the sub feature vector for the k-th coordinate, $r_k^t$ represents the regression function for the k-th coordinate for a certain aligning process (in a cascaded process repeated for T times, variable t can range from 1 to T), and the symbol "*" represents projection or interaction (such as multiplication, dot product, or the like). FIG. 23 gives a structural illustration of Expression (6). In FIG. 23, for simplicity, as in FIG. 14, only the SIFT feature descriptors for 4 grids are illustrated.

Incidentally, it is to be noted that step 500 for predicting coordinate increments needs only to be applied to at least one coordinate of at least one feature point of the initial object shape. However, step 500 can also be preferably applied to each coordinate of a plurality of feature points of the initial object shape. This is not particularly limited in the present invention.

Up to now, the object shape aligning method of the present invention has been schematically described. It can be seen by a comparison between the SDM and the method of the present invention, the SDM predicts the coordinate increments of different coordinates in an object shape by using one same feature vector and one united regression function; whereas the object shape aligning method of the present invention independently predicts the coordinate increments of different coordinates in an object shape by using different feature fragments and different regression functions. More specifically, in the SDM (see Expression (1) and FIG. 14), one high dimensional feature vector F comprising a plurality of features (i.e., a dense feature set) and one united regression function $R^t$ for the whole object shape are employed to predict the coordinate increments $\Delta S$ of a plurality of coordinates; in contrast, in the present invention (see Expression (6) and FIG. 23), for each coordinate in the object shape, a specific sub feature vector $f_k$ (having much lower dimensionality and comprising only the most correlated or valuable features) and a specific regression function $r_k^t$ are employed to independently predict the coordinate increment $\Delta s_k$ of the one coordinate. Due to the above reasons, the present invention is able to reduce the model size, to achieve higher accuracy and/or higher speed and/or higher robustness, or the like, as will be seen more clearly hereinafter.

Figure 20:
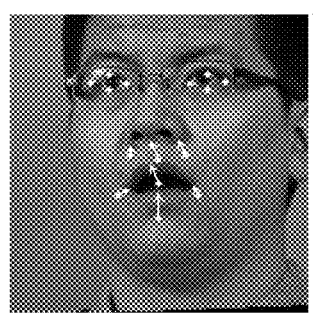
FIG. 20 schematically shows feature point movement in the step for moving feature points to their updated positions according to the present invention.

Optionally, after coordinate increments are predicted for the coordinates in the initial object shape, the at least one feature point may be moved to its updated positions by adding the corresponding coordinate increment for the at least one coordinate of the at least one feature point. Thus, an updated object shape is obtained. FIG. 20 schematically shows the feature point movement. The arrows in FIG. 20 indicate updated positions of the feature points, which seem more close to the ground truth.

Figure 7:
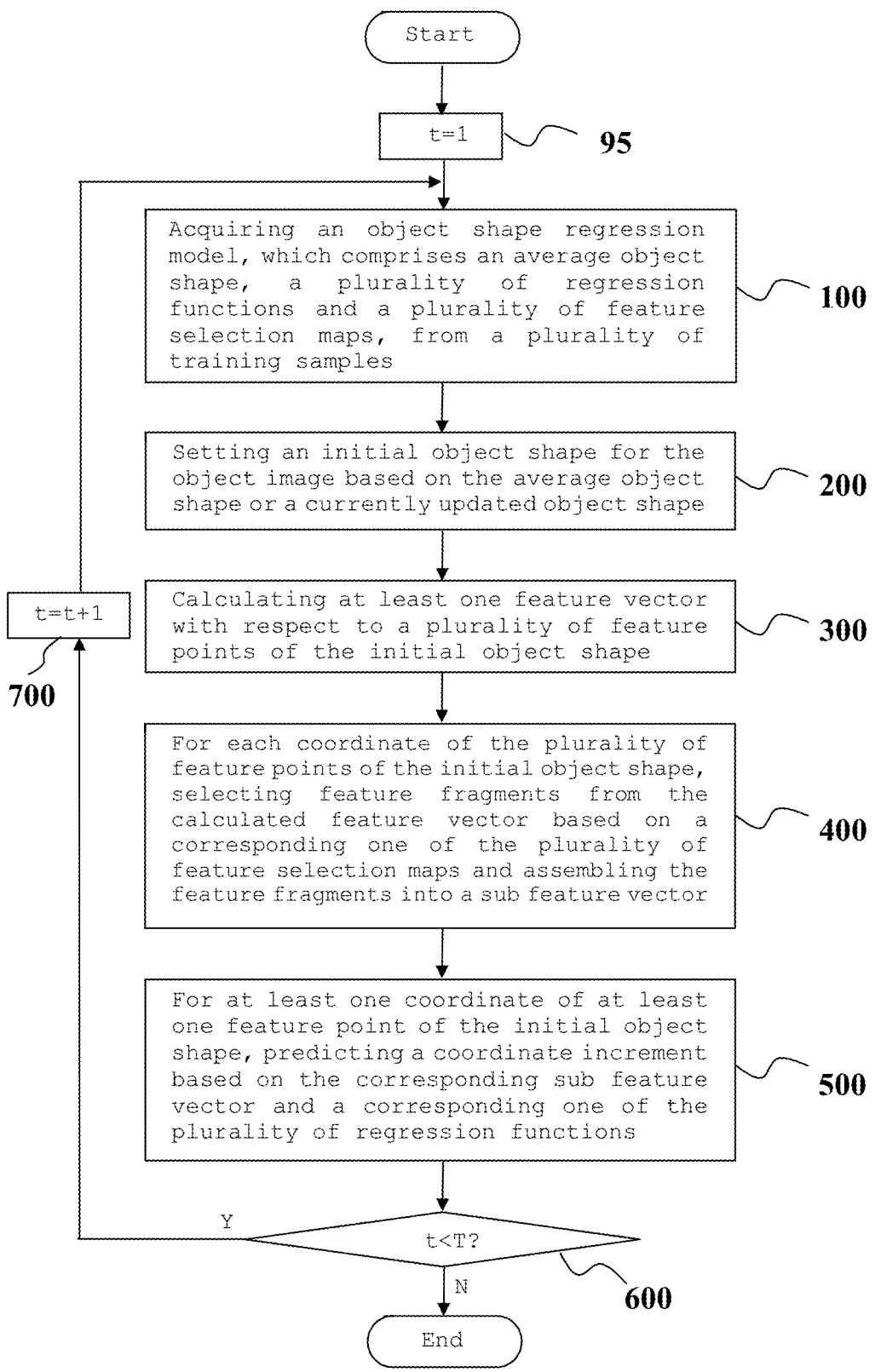
FIG. 7 schematically shows a general flowchart of a cascaded object shape aligning method according to the present invention.

In addition, optionally, the aligning process in FIG. 4 can be repeated for several times (e.g., T times) so as to approach the ground truth of the object shape step by step (this is why the regression function in Expression (6) has a superscript "t"). In other words, cascaded regressors can be employed for the aligning process. FIG. 7 gives a schematic flowchart of a cascaded object shape aligning method according to the present invention. Its main steps are essentially the same as those of FIG. 4.

As shown in FIG. 7, first, at step 95, variable t is set to 1. Then, the process goes to steps 100, 200, 300, 400, 500 (which are the same as those in FIG. 4) sequentially. Next, at step 600, it is judged whether t is smaller than a threshold T (T is an empirically determined value; since the method of the present invention is a variant of Newton's method, its convergence rate is quadratic and thus T can be only about 4~5 for example). If Yes, the process goes to step 700 where t is incremented by 1, and then goes back to step 100; or else, the process ends.

That is to say, in the present invention, the step of acquiring the object shape regression model, the step of setting the initial object shape, the step of calculating the at least one feature vector, the step of selecting the feature fragments and assembling the feature fragments, and the step of predicting the coordinate increment can be sequentially performed repeatedly by using different object shape regression models and setting a currently updated object shape as the initial object shape for the next object shape regression model.

It is noted that, though the object shape aligning method of the present invention has been described above by taking the face shape as example, it is not necessarily limited thereto. In fact, the object shape aligning method of the present invention can also be applied to various other object shapes, including but not limited to the body shape, for example. In the case of aligning a body shape, positions of body parts such as head, hands, knees, feet and the like can be detected.

Now, effects of the object shape aligning method of the present invention will be evaluated.

The evaluation is made by utilizing public available face datasets including FERET, PIE, BioID, Indian Face Database, CVLAB and Labelled Faces in the Wild (LFW). In order to evaluate under different conditions, tested face images are separated into 6 datasets. Three datasets include face images that are randomly selected from FERET, BioID, PIE, CVLAB and Indian Face Database, which are collected under controlled indoor conditions and thus show little variations in background, expression, lighting or the like. The other three datasets include face images that are randomly selected from LFW, which are collected from the web (i.e., under uncontrolled conditions) and thus show large variations in pose, expression, lighting, focus, background or the like.

According to the RMSE (Root Mean Square Error) histogram results and the cumulative probability results of these 6 datasets, the performance of the object shape aligning method of the present invention is very stable on datasets that are randomly selected from the same condition. It can be concluded that the performance on the selected datasets can represent the true performance under the corresponding conditions. Moreover, the object shape aligning method of the present invention is very robust to variations of age, facial expression, viewing angle, race, illumination or the like.

Table 1 gives performance comparison between the SDM and the object shape aligning method of the present invention on the LFW datasets.

TABLE 1

| Methods | Accuracy (RMS) | | | Model size (KB) | Speed (ms/face) |
| --- | --- | --- | --- | --- | --- |
| | <5 pixels | <7.5 pixels | <10 pixels | | |
| SDM | 96.3% | 99.7% | 99.9% | 196 | 13 |
| This invention | 96.8% | 99.7% | 100.0% | 40 | 12 |

As is readily apparent from Table 1, for the object shape aligning method of the present invention, the model size is greatly reduced with comparative time cost and better accuracy.

Figure 24:
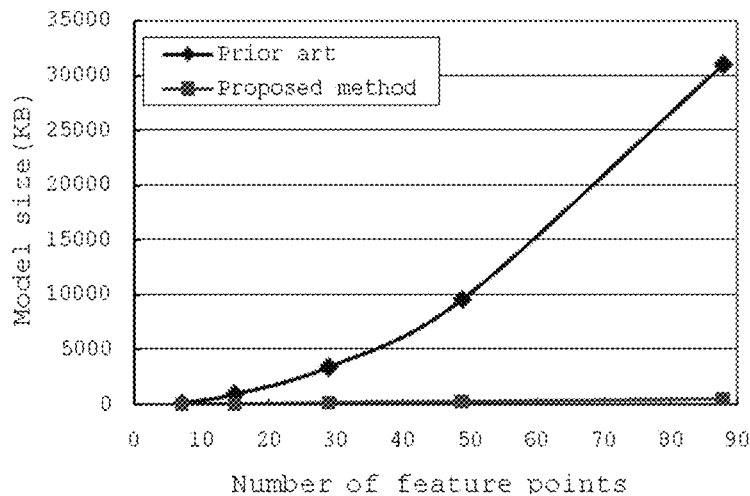
FIG. 24 schematically shows the model size growth curves for the SDM and the present invention, respectively.
Figure 25:
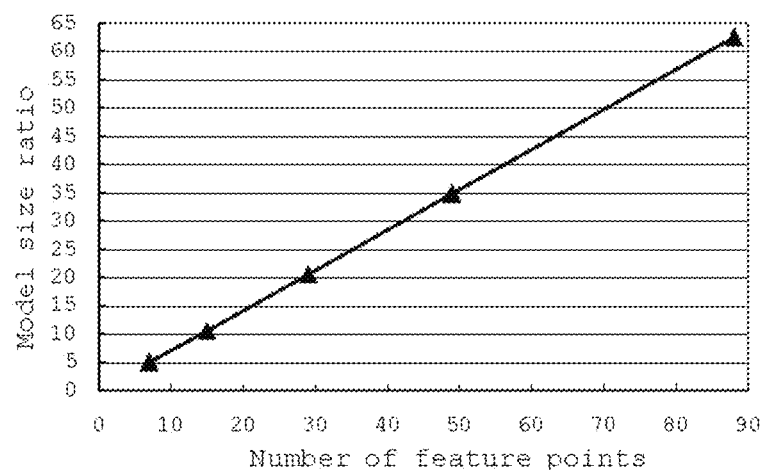
FIG. 25 schematically shows the model size ratio (the ratio of the SDM to the present invention) curve.

Moreover, Table 2 shows the model sizes and the ratio of model size for the SDM and the present invention with respect to the number of feature points, and these results are schematically shown in FIGS. 24~25.

TABLE 2

| Number of points | Model size (KB) (SDM) | Model size (KB) (this invention) | Ratio of model size (SDM/this invention) |
| --- | --- | --- | --- |
| 7 | 196 | 39.375 | 4.98 |
| 15 | 900 | 84.375 | 10.67 |
| 29 | 3364 | 163.125 | 20.62 |
| 49 | 9604 | 275.625 | 34.84 |
| 88 | 30976 | 495.000 | 62.58 |

As can be seen from FIG. 24, substantially, the model size growth rate is quadratic for the SDM, whereas it is only linear for the object shape aligning method of the present invention. Therefore, as can be seen from FIG. 25, substantially, the curve for the model size ratio between the SDM and the present invention is linear. That is to say, as compared to the prior art, the present invention is able to reduce the model size greatly, and this effect is more remarkable for cases with more feature points. For example, in the case of 7 feature points, the model size of the present invention is about ⅕ of that of the SDM; and in the case of 88 feature points, the model size of the present invention is only about 1/60 of that of the SDM.

To sum up, the object shape aligning method of the present invention only uses the most correlated features for predicting and thus gets rid of random errors or noises of irrelevant features. This makes it only need smaller amount of training samples and thus overcome the over-fitting problem. In addition, due to the feature selection, the object shape aligning method of the present invention can further overcome the multicolinearity problem and reduce the model size greatly as compared to the prior art. As a result, both the model training procedure and the object shape aligning procedure can be speeded up. Furthermore, in the case of a cascaded process, the convergence rate for the object shape aligning method of the present invention is quadratic, and usually only 4~5 loops are needed.

Figure 8:
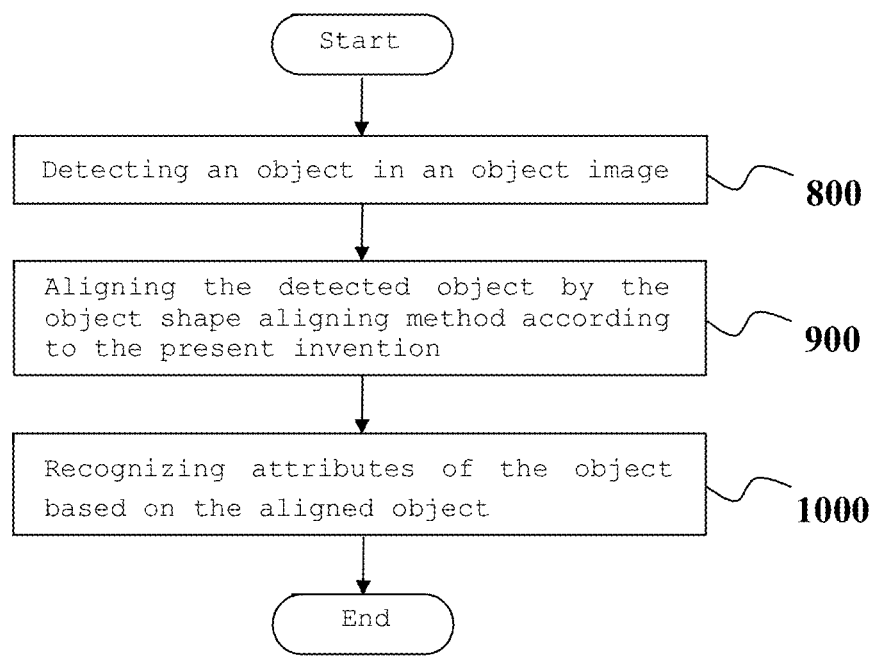
FIG. 8 schematically shows a general flowchart of the object processing method according to the present invention.

Needless to say, the object shape aligning method of the present invention can be applied to various fields. FIG. 8 schematically shows a general flowchart of the object processing method for an object image according to the present invention.

As shown in FIG. 8, first, at step 800, an object in the object image is detected. The object detecting method is not particularly limited.

Next, at step 900, the detected object is aligned by the object shape aligning method according to the present invention. That is to say, feature points are detected or localized.

Finally, at step 1000, attributes of the object are recognized based on the aligned object. The attributes of the object are not particularly limited. For example, they can include but are not limited to expression, age, race, gender, body pose, and combination thereof. The obtained attributes can be widely used for face recognition, expression analysis, 3D face modelling, face cartoon animation, interactive game control, robot control, human behaviour analysis in visual surveillance system etc.

More specifically, one application example involves face recognition. For example, a detected face in an input image can be aligned according to the object shape aligning method of the present invention, and then attributes of the face can be recognized based on the aligned face. Based on the recognized attributes, the expression (such as joy, sadness, anger or the like), age, race, gender etc. of a subject can be determined.

Another application example involves human behaviour analysis. For example, a detected human body in an input image can be aligned according to the object shape aligning method of the present invention, and then attributes of the human body can be recognized based on the aligned human body. Based on the recognized attributes, human body pose information such as standing, crouching, sitting, lying etc. of a subject can be determined.

Below, the object shape aligning method and the object processing method of the present invention are briefly summarized.

The object shape aligning method for an object image of the present invention can comprise steps of: acquiring an object shape regression model, which comprises an average object shape, a plurality of regression functions and a plurality of feature selection maps, from a plurality of training samples; setting an initial object shape for the object image based on the average object shape; calculating at least one feature vector with respect to a plurality of feature points of the initial object shape; for each coordinate of the plurality of feature points of the initial object shape, selecting feature fragments from the calculated feature vector based on a corresponding one of the plurality of feature selection maps and assembling the feature fragments into a sub feature vector; and for at least one coordinate of at least one feature point of the initial object shape, predicting a coordinate increment based on the corresponding sub feature vector and a corresponding one of the plurality of regression functions.

In some embodiments of the present invention, in the step of acquiring the object shape regression model, a L1-norm regularized linear regression method, in which a residual sum of square loss function with L1-norm regularization is introduced and Least Angle Regression with Lasso modification is employed to minimize the residual sum of square loss function with L1-norm regularization, can be used.

In some embodiments of the present invention, the step of acquiring the object shape regression model can further comprise steps of: obtaining the plurality of training samples with labelled object shapes, the average object shape being the average of the labelled object shapes of the plurality of training samples; for each training sample, setting an initial object shape based on the average object shape, and calculating a residual of each coordinate of its plurality of feature points between its labelled object shape and its initial object shape; for each training sample, calculating at least one feature vector with respect to the plurality of feature points of its initial object shape; for corresponding coordinates of corresponding feature points of the plurality of training samples, fitting the object shape regression model between the feature vectors of the plurality of training samples and the residuals of the corresponding coordinates using the L1-norm regularized linear regression method; and for corresponding coordinates of corresponding feature points of the plurality of training samples, recording indices of the selected feature fragments in the feature vectors as the feature selection map and parameters corresponding to the selected feature fragments as a parameter vector of the regression function.

In some embodiments of the present invention, in the step of setting the initial object shape, the average object shape itself or the average object shape after random perturbation can be set as the initial object shape.

In some embodiments of the present invention, in the step of calculating the at least one feature vector, Scale Invariant Feature Transform features can be extracted from a local image patch around each feature point of the initial object shape.

In some embodiments of the present invention, in the step of selecting feature fragments, the feature fragments can be selected from the calculated feature vector based on feature indices in the corresponding one of the plurality of feature selection maps; and in the step of assembling the feature fragments, the feature fragments can be assembled into the sub feature vector based on the feature order in the corresponding one of the plurality of feature selection maps.

In some embodiments of the present invention, the step of predicting the coordinate increment can further comprise steps of: for the at least one coordinate of the at least one feature point, acquiring a parameter vector of the corresponding one of the plurality of regression functions; and for the at least one coordinate of the at least one feature point, projecting the corresponding sub feature vector onto the parameter vector to obtain the coordinate increment.

In some embodiments of the present invention, the object shape aligning method can further comprise a step of: moving the at least one feature point to its updated positions by adding the corresponding coordinate increment for the at least one coordinate of the at least one feature point.

In some embodiments of the present invention, the step of acquiring the object shape regression model, the step of setting the initial object shape, the step of calculating the at least one feature vector, the step of selecting the feature fragments and assembling the feature fragments, and the step of predicting the coordinate increment can be sequentially performed repeatedly by using different object shape regression models and setting a currently updated object shape as the initial object shape for the next object shape regression model.

In some embodiments of the present invention, the object shape can comprise a face shape or a body shape.

In addition, the object processing method for an object image of the present invention can comprise steps of: detecting an object in the object image; aligning the detected object by the object shape aligning method according to the present invention; and recognizing attributes of the object based on the aligned object.

In some embodiments of the present invention, the attributes of the object can include any combination of expression, age, race, gender and body pose.

Hereinafter, the object shape aligning apparatus and the object processing apparatus of the present invention will be described briefly with reference to FIGS. 9-10.

Figure 9:
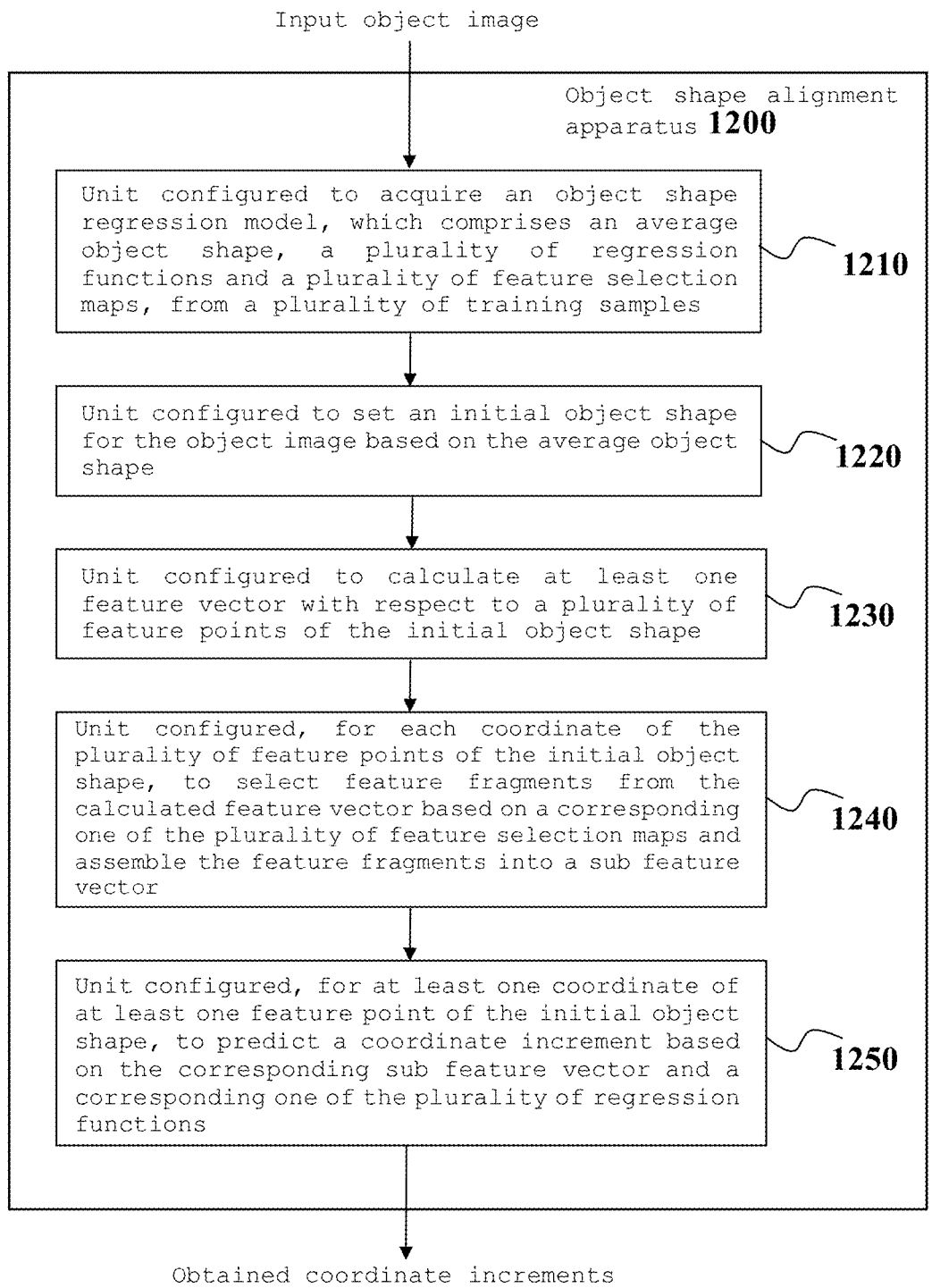
FIG. 9 schematically shows a general block diagram of an object shape aligning apparatus according to the present invention.

As shown in FIG. 9, the object shape aligning apparatus 1200 for an object image of the present invention can comprise: a unit 1210 configured to acquire an object shape regression model, which comprises an average object shape, a plurality of regression functions and a plurality of feature selection maps, from a plurality of training samples; a unit 1220 configured to set an initial object shape for the object image based on the average object shape; a unit 1230 configured to calculate at least one feature vector with respect to a plurality of feature points of the initial object shape; a unit 1240 configured, for each coordinate of the plurality of feature points of the initial object shape, to select feature fragments from the calculated feature vector based on a corresponding one of the plurality of feature selection maps and assemble the feature fragments into a sub feature vector; and a unit 1250 configured, for at least one coordinate of at least one feature point of the initial object shape, to predict a coordinate increment based on the corresponding sub feature vector and a corresponding one of the plurality of regression functions.

In some embodiments of the present invention, in the unit 1210 configured to acquire the object shape regression model, a L1-norm regularized linear regression method, in which a residual sum of square loss function with L1-norm regularization is introduced and Least Angle Regression with Lasso modification is employed to minimize the residual sum of square loss function with L1-norm regularization, is used.

In some embodiments of the present invention, the unit 1210 configured to acquire the object shape regression model can further comprise: a unit configured to obtain the plurality of training samples with labelled object shapes, the average object shape being the average of the labelled object shapes of the plurality of training samples; a unit configured, for each training sample, to set an initial object shape based on the average object shape, and calculate a residual of each coordinate of its plurality of feature points between its labelled object shape and its initial object shape; a unit configured, for each training sample, to calculate at least one feature vector with respect to the plurality of feature points of its initial object shape; a unit configured, for corresponding coordinates of corresponding feature points of the plurality of training samples, to fit the object shape regression model between the feature vectors of the plurality of training samples and the residuals of the corresponding coordinates using the L1-norm regularized linear regression method; and a unit configured, for corresponding coordinates of corresponding feature points of the plurality of training samples, to record indices of the selected feature fragments in the feature vectors as the feature selection map and parameters corresponding to the selected feature fragments as a parameter vector of the regression function.

In some embodiments of the present invention, in the unit 1220 configured to set the initial object shape, the average object shape itself or the average object shape after random perturbation can be set as the initial object shape.

In some embodiments of the present invention, in the unit 1230 configured to calculate the at least one feature vector, Scale Invariant Feature Transform features can be extracted from a local image patch around each feature point of the initial object shape.

In some embodiments of the present invention, in the unit 1240 configured to select feature fragments and assemble the feature fragments, the feature fragments can be selected from the calculated feature vector based on feature indices in the corresponding one of the plurality of feature selection maps; and the feature fragments can be assembled into the sub feature vector based on the feature order in the corresponding one of the plurality of feature selection maps.

In some embodiments of the present invention, the unit 1250 configured to predict the coordinate increment can further comprise: a unit configured, for the at least one coordinate of the at least one feature point, to acquire a parameter vector of the corresponding one of the plurality of regression functions; and a unit configured, for the at least one coordinate of the at least one feature point, to project the corresponding sub feature vector onto the parameter vector to obtain the coordinate increment.

In some embodiments of the present invention, the object shape aligning apparatus 1200 can further comprise: a unit configured to move the at least one feature point to its updated positions by adding the corresponding coordinate increment for the at least one coordinate of the at least one feature point.

In some embodiments of the present invention, the operations of the unit 1210 configured to acquire the object shape regression model, the unit 1220 configured to set the initial object shape, the unit 1230 configured to calculate the at least one feature vector, the unit 1240 configured to select the feature fragments and assemble the feature fragments, and the unit 1250 configured to predict the coordinate increment can be sequentially performed repeatedly by using different object shape regression models and setting a currently updated object shape as the initial object shape for the next object shape regression model.

In some embodiments of the present invention, the object shape can comprise a face shape or a body shape.

Figure 10:
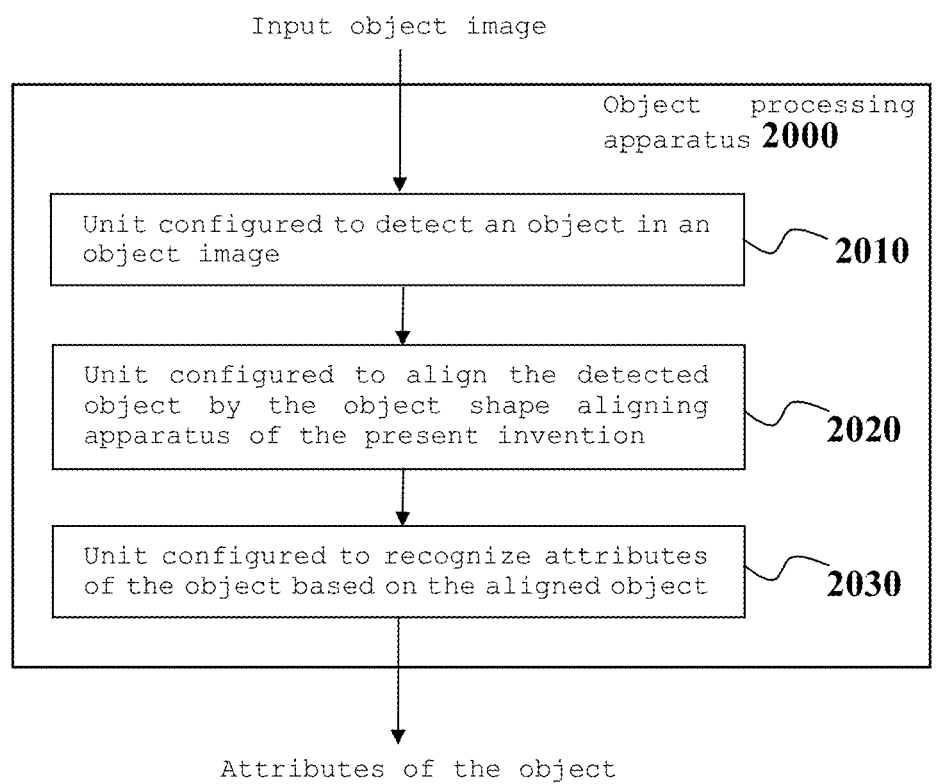
FIG. 10 schematically shows a general block diagram of an object processing apparatus according to the present invention.

In addition, as shown in FIG. 10, the object processing apparatus 2000 for an object image of the present invention can comprise: a unit 2010 configured to detect an object in the object image; a unit 2020 configured to align the detected object by the object shape aligning apparatus of the present invention; and a unit 2030 configured to recognize attributes of the object based on the aligned object.

In some embodiments of the present invention, the attributes of the object can include any combination of expression, age, race, gender and body pose.

Up to now, the object shape aligning apparatus, the object processing apparatus and methods thereof according to the present invention have been described schematically. It shall be noted that, all the above apparatuses are exemplary preferable modules for implementing the object shape aligning method and/or object processing method of the present invention. However, modules for implementing the various steps are not described exhaustively above. Generally, where there is a step of performing a certain process, there is a corresponding functional module or means for implementing the same process. In addition, it shall be noted that, two or more means can be combined as one means as long as their functions can be achieved; on the other hand, any one means can be divided into a plurality of means, as long as similar functions can be achieved.

It is possible to implement the methods, devices and apparatuses of the present invention in many ways. For example, it is possible to implement the methods, devices and apparatuses of the present invention through software, hardware, firmware or any combination thereof. In addition, the above-described order of the steps for the methods is only intended to be illustrative, and the steps of the methods of the present invention are not necessarily limited to the above specifically described order unless otherwise specifically stated. Besides, in some embodiments, the present invention can also be embodied as programs recorded in a recording medium, including machine-readable instructions for implementing the methods according to the present invention. Thus, the present invention also covers recording mediums which store the programs for implementing the methods according to the present invention.

While the present invention has been described with reference to exemplary embodiments, it is to be understood that the present invention is not limited to the disclosed exemplary embodiments. It is apparent to those skilled in the art that the above exemplary embodiments may be modified without departing from the scope and spirit of the present invention. The scope of the following claims is to be accorded the broadest interpretation so as to encompass all such modifications and equivalent structures and functions.

What is claimed is:

1. An apparatus comprising:
a unit configured to acquire an object shape regression model having an average object shape, a plurality of regression functions and a plurality of feature selection maps, from a plurality of training samples;
a unit configured to set an initial object shape for an object image based on the average object shape;
a unit configured to calculate at least one feature vector with respect to a plurality of feature points of the initial object shape;
a unit configured, for each coordinate of the plurality of feature points, to select feature fragments from the calculated feature vector based on a corresponding one of the plurality of feature selection maps and assemble the feature fragments into a sub feature vector; and
a unit configured, for at least one coordinate of at least one feature point, to predict a coordinate increment based on the corresponding sub feature vector and a corresponding one of the plurality of regression functions.

2. The apparatus according to claim 1, wherein in the unit configured to acquire the object shape regression model, a L1-norm regularized linear regression method, in which a residual sum of square loss function with L1-norm regularization is introduced and Least Angle Regression with Lasso modification is employed to minimize the residual sum of square loss function with L1-norm regularization, is used.

3. The apparatus according to claim 2, wherein the unit configured to acquire the object shape regression model further comprises:
a unit configured to obtain the plurality of training samples with labelled object shapes, the average object shape being the average of the labelled object shapes of the plurality of training samples;
a unit configured, for each training sample, to set an initial object shape based on the average object shape, and calculate a residual of each coordinate of its plurality of feature points between its labelled object shape and its initial object shape;
a unit configured, for each training sample, to calculate at least one feature vector with respect to the plurality of feature points of its initial object shape;
a unit configured, for corresponding coordinates of corresponding feature points of the plurality of training samples, to fit the object shape regression model between the feature vectors of the plurality of training samples and the residuals of the corresponding coordinates using the L1-norm regularized linear regression method; and
a unit configured, for corresponding coordinates of corresponding feature points of the plurality of training samples, to record indices of the selected feature fragments in the feature vectors as the feature selection map and parameters corresponding to the selected feature fragments as a parameter vector of the regression function.

4. The apparatus according to claim 1, wherein in the unit configured to set the initial object shape, the average object shape itself or the average object shape after random perturbation is set as the initial object shape.

5. The apparatus according to claim 1, wherein in the unit configured to calculate the at least one feature vector, Scale Invariant Feature Transform features are extracted from a local image patch around each feature point of the initial object shape.

6. The apparatus according to claim 1, wherein in the unit configured to select feature fragments and assemble the feature fragments,
the feature fragments are selected from the calculated feature vector based on feature indices in the corresponding one of the plurality of feature selection maps; and
the feature fragments are assembled into the sub feature vector based on the feature order in the corresponding one of the plurality of feature selection maps.

7. The apparatus according to claim 1, wherein the unit configured to predict the coordinate increment further comprises:
a unit configured, for the at least one coordinate of the at least one feature point, to acquire a parameter vector of the corresponding one of the plurality of regression functions; and
a unit configured, for the at least one coordinate of the at least one feature point, to project the corresponding sub feature vector onto the parameter vector to obtain the coordinate increment.

8. The apparatus according to claim 1, further comprising:
a unit configured to move the at least one feature point to its updated positions by adding the corresponding coordinate increment for the at least one coordinate of the at least one feature point.

9. The object shape aligning apparatus according to claim 1, wherein operations of the unit configured to acquire the object shape regression model, the unit configured to set the initial object shape, the unit configured to calculate the at least one feature vector, the unit configured to select the feature fragments and assemble the feature fragments, and the unit configured to predict the coordinate increment are sequentially performed repeatedly by using different object shape regression models and setting a currently updated object shape as the initial object shape for a next object shape regression model.

10. The apparatus according to claim 1, wherein the object shape comprises a face shape or a body shape.

11. An apparatus comprising:
a unit configured to detect an object in an object image;
a unit configured to align the detected object by the apparatus of claim 1; and
a unit configured to recognize attributes of the object based on the aligned object.

12. The apparatus according to claim 11, wherein the attributes of the object include any combination of expression, age, race, gender and body pose.

13. A method comprising:
acquiring an object shape regression model having an average object shape, a plurality of regression functions and a plurality of feature selection maps, from a plurality of training samples;
setting an initial object shape for an object image based on an average object shape;
calculating at least one feature vector with respect to a plurality of feature points of the initial object shape;
for each coordinate of the plurality of feature points, selecting feature fragments from the calculated feature vector based on a corresponding one of the plurality of feature selection maps and assembling the feature fragments into a sub feature vector; and
for at least one coordinate of at least one feature point, predicting a coordinate increment based on the corresponding sub feature vector and a corresponding one of the plurality of regression functions.

14. The method according to claim 13, wherein in the acquiring the object shape regression model, a L1-norm regularized linear regression method, in which a residual sum of square loss function with L1-norm regularization is introduced and Least Angle Regression with Lasso modification is employed to minimize the residual sum of square loss function with L1-norm regularization, is used.

15. The method according to claim 14, wherein the acquiring the object shape regression model further comprises:
obtaining the plurality of training samples with labelled object shapes, the average object shape being the average of the labelled object shapes of the plurality of training samples;
for each training sample, setting an initial object shape based on the average object shape, and calculating a residual of each coordinate of its plurality of feature points between its labelled object shape and its initial object shape;
for each training sample, calculating at least one feature vector with respect to the plurality of feature points of its initial object shape;
for corresponding coordinates of corresponding feature points of the plurality of training samples, fitting the object shape regression model between the feature vectors of the plurality of training samples and the residuals of the corresponding coordinates using the L1-norm regularized linear regression method; and
for corresponding coordinates of corresponding feature points of the plurality of training samples, recording indices of the selected feature fragments in the feature vectors as the feature selection map and parameters corresponding to the selected feature fragments as a parameter vector of the regression function.

16. The method according to claim 13, wherein in the setting the initial object shape, the average object shape itself or the average object shape after random perturbation is set as the initial object shape.

17. The method according to claim 13, wherein in the calculating the at least one feature vector, Scale Invariant Feature Transform features are extracted from a local image patch around each feature point.

18. The method according to claim 13, wherein
in the selecting feature fragments, the feature fragments are selected from the calculated feature vector based on feature indices in the corresponding one of the plurality of feature selection maps; and
in the assembling the feature fragments, the feature fragments are assembled into the sub feature vector based on the feature order in the corresponding one of the plurality of feature selection maps.

19. The method according to claim 13, wherein the predicting the coordinate increment further comprises:
for the at least one coordinate of the at least one feature point, acquiring a parameter vector of the corresponding one of the plurality of regression functions; and
for the at least one coordinate of the at least one feature point, projecting the corresponding sub feature vector onto the parameter vector to obtain the coordinate increment.

20. The method according to claim 13, further comprising:
moving the at least one feature point to its updated positions by adding the corresponding coordinate increment for the at least one coordinate of the at least one feature point.

21. The method according to claim 13, wherein the acquiring the object shape regression model, the setting the initial object shape, the calculating the at least one feature vector, the selecting the feature fragments and assembling the feature fragments, and the predicting the coordinate increment are sequentially performed repeatedly by using different object shape regression models and setting a currently updated object shape as the initial object shape for a next object shape regression model.

22. The method according to claim 13, wherein the object shape comprises a face shape or a body shape.

23. A method comprising:
detecting an object in an object image;
aligning the detected object by the method according to claim 13; and
recognizing attributes of the object based on the aligned object.

24. The method according to claim 23, wherein the attributes of the object include any combination of expression, age, race, gender and body pose.

25. A device, comprising:
one or more processors; and
a memory comprising program instructions executable by at least one of the one or more processors to:
acquire an object shape regression model having an average object shape, a plurality of regression functions and a plurality of feature selection maps, from a plurality of training samples;
set an initial object shape for the object image based on the average object shape;
calculate at least one feature vector with respect to a plurality of feature points of the initial object shape;
for each coordinate of the plurality of feature points, select feature fragments from the calculated feature vector based on a corresponding one of the plurality of feature selection maps and assembling the feature fragments into a sub feature vector; and
for at least one coordinate of at least one feature point, predict a coordinate increment based on the corresponding sub feature vector and a corresponding one of the plurality of regression functions.

* * * * *